US012438370B2

(12) United States Patent
Driscoll et al.

(10) Patent No.: US 12,438,370 B2
(45) Date of Patent: Oct. 7, 2025

(54) LOAD SHEDDING IN ADVANCED METERING INFRASTRUCTURE

(71) Applicant: Itron, Inc., Liberty Lake, WA (US)

(72) Inventors: Timothy James Driscoll, Raleigh, NC (US); Donald Lloyd Reeves, III, Pleasanton, CA (US); Benjamin Damm, Point Roberts, WA (US); Juan Alemany, Liberty Lake, WA (US); David Wu Ganger, Lakewood, CO (US); Julia Ahopelto, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 370 days.

(21) Appl. No.: 18/105,543

(22) Filed: Feb. 3, 2023

(65) Prior Publication Data

US 2024/0266830 A1    Aug. 8, 2024

(51) Int. Cl.
*H02J 3/14*    (2006.01)
*G01D 4/00*    (2006.01)
*G06Q 50/06*   (2012.01)

(52) U.S. Cl.
CPC ............... *H02J 3/14* (2013.01); *G01D 4/004* (2013.01); *G06Q 50/06* (2013.01); *H02J 2203/10* (2020.01); *H02J 2310/60* (2020.01)

(58) Field of Classification Search
CPC ........ G06Q 10/04; G06Q 10/06; G06Q 50/06; G01D 4/004; H02J 3/14; H02J 3/144; H02J 13/00036
USPC .................................. 700/286, 291, 295, 297
See application file for complete search history.

(56) References Cited

U.S. PATENT DOCUMENTS

| 8,068,938 | B2 * | 11/2011 | Fujita | G06Q 10/04 |
| | | | | 700/297 |
| 2010/0179670 | A1 | 7/2010 | Forbes, Jr. et al. | |
| 2015/0134280 | A1 | 5/2015 | Narayan et al. | |
| 2023/0339353 | A1 * | 10/2023 | Day | B60L 53/62 |

FOREIGN PATENT DOCUMENTS

| AU | 2012232950 B2 * | 5/2016 | ........... H01H 71/125 |
| CA | 2773725 A1 * | 10/2012 | ............ B60L 53/305 |

OTHER PUBLICATIONS

Al Jajeh, et. al, "Island of a Microgrid Using a Distributed Multi-agent Control System", 2019 IEEE Energy Conversion Congress and Exposition (Ecce), IEEE, Sep. 29, 2019, pp. 6286-6293.
Search Report and Written Opinion for European Application No. 24154968.2, Dated Jul. 3, 2024, 8 pages.
Office Action for Canadian Application No. 3,225,813, Dated Feb. 21, 2025, 8 pages.

* cited by examiner

*Primary Examiner* — Crystal J Barnes-Bullock
(74) *Attorney, Agent, or Firm* — Lee & Hayes, P.C.

(57) ABSTRACT

A method, apparatus, and system for disconnecting loads from the electrical grid are disclosed. An application programming interface (API) frontend of an advanced metering infrastructure (AMI) load shedding system may receive a load shedding activation command; in response to receiving the load shedding activation command, the API frontend may deploy a load shedding token to one or more electricity meters of the AMI load shedding system, and cause the one or more electricity meters to disconnect corresponding loads from the one or more electricity meters.

20 Claims, 8 Drawing Sheets

LOAD SHEDDING IN ADVANCED METERING INFRASTRUCTURE

TECHNICAL FIELD

The present disclosure generally relates to the field of electrical load management, and more specifically to methods, devices, and systems for preparing to disconnect and disconnecting premises via associated electricity meters from an electrical power grid.

BACKGROUND

A utility provider may perform load shedding by disconnecting services to some customers to prevent the electricity distribution system, or the grid, from being overloaded. The utility provider may also perform load shedding when demand for electrical power exceeds, or is expected to exceed, the available power, i.e., the demand is greater than the amount of power the generator is able to produce. For example, the weather conditions are expected to be hotter than usual for a few days, and the utility provider expects the demand for electricity, due to cooling, may exceed the available power. During the load shedding, electricity to specific power lines, a specific section of the electrical grid, or a feeder, which provide electricity to a group of customers' homes and businesses, may be turned off while maintaining electricity to other customers. However, critical services, such as hospitals, fire and police departments are frequently on the same feeder as non-critical loads, such as residential customers.

Because present load shedding techniques require disconnection of entire feeders or distribution system sections, which the critical services may share with non-critical loads, the non-critical loads in those feeders or sections are unavailable for load disconnection. These non-critical loads may never experience a load disconnection event from the utility provider, which may prevent the utility provider from maximizing non-critical load disconnection resources and providing social equity for being able to distribute the load disconnection burden to all non-critical ratepayers in their territory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
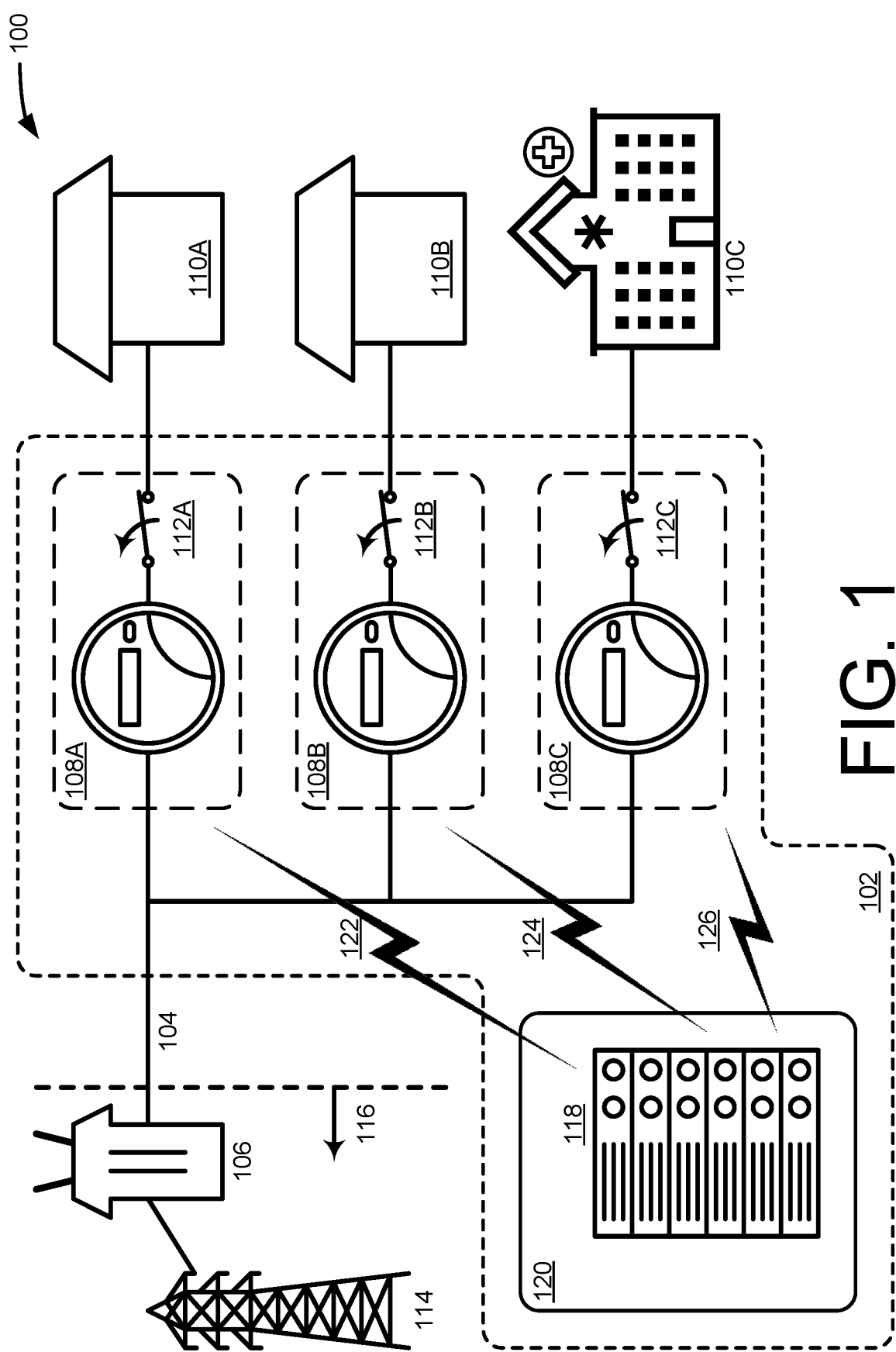
FIG. 1 illustrates an example environment in which an advanced metering infrastructure (AMI) load shedding system may be utilized.

FIG. 1 illustrates an example environment 100 in which an advanced metering infrastructure (AMI) load shedding system 102 may be utilized. In this example, a power line 104 from a transformer 106 is shown to be connected to a plurality of endpoints, such as electricity meters 108, which may be smart meters of an AMI, through which electricity is provided to associated premises 110. Endpoints, or endpoint devices, are devices connected to a network and are capable of communicating and exchanging information among devices in the network. As described in this example, the endpoints include smart meters in an AMI. Other examples include portable/mobile devices, smart appliances, internet-of-things (IoT) devices, and the like, in a wired and/or wireless communication network, such as a cellular communication network, a wireless local area network (WLAN), a mesh network, power line communication network, the internet, and the like.

In this example, three electricity meters, 108A, 108B, and 108C, are shown to provide electricity to the associated premises, 110A, 1101B, and 110C, respectively, for powering various electric devices in the premises 110. In this example, the premises 110A and 1101B may be non-critical loads, such as residential houses, and the premises 110C may represent a critical load, such as a hospital, fire station, police station, or the like. The electricity meter 108 may comprise an internal switch 112 (shown in a closed/connected position outside of the electricity meter housing for clarity) which is capable of disconnecting electricity supplied to the load side output of the electricity meter 108 which connects, and supplies electricity, to the premises 110. In this example, the transformer 106 is shown to be connected to a transmission tower 114 and represents a portion of the electrical power grid 116 which comprises power stations, sub-stations, transmission lines, and other electric distribution components (not shown).

The demand may in some circumstances exceed the available power due to a number of reasons, such as many consumers simultaneously charging electric vehicles at night at home, extreme weather conditions in which a large number of consumers are expected to continuously use heating or cooling equipment, or the like. The demand may also exceed the available power due to variations in power production (e.g., at night for solar power generation, on days with little or no wind for wind generation, etc.), if one or more power generators or sources go offline, or if some transmission lines become disconnected and fail to provide power from the generators to some parts of the grid. To maintain the integrity of the grid 116 and avoid a catastrophic grid failure, the demand needs to be able to be reduced, which may be accomplished by load shedding, i.e., disconnecting the service to some customers. Instead of disconnecting the service to a large area, which may comprise multiple regions, in a single disconnect, electricity meters of individual premises and buildings may be utilized to accomplish the load shedding. For example, 500 residential customers including the residential premises 110A and 110B may be disconnected from the grid 116 in a load shedding process while a critical load, such as the critical premises 110C (e.g., hospital), which is on the same feeder as the residential premises 110A and 110B, may remain connected to the grid 116.

The AMI load shedding system 102 may comprise the electricity meters 108 and an AMI load shedding control server, or a control server, 118 associated with a control center 120 of the utility provider. The control server 118 may communicate with the electricity meters 108 to provide various instructions. In this example, the control server 118 is shown to communicate with the electricity meters 108A, 108B, and 108C wirelessly, as shown by arrows 122, 124, and 126, respectively. However, the communications between the electricity meters 108 and the control server 118 may be established in various ways, such as via a cellular network, Wi-Fi network, other radio frequency (RF) network, cable network, landline telephone network, the internet, and the like. The network may be configured as a mesh network, a star network, other communication network topology. In this example, the control server 118 may send instructions to the electricity meters 108A and 108B to open the internal switch 112A and 112B, respectively, to disconnect the electrical service to the premises 110A and 110B, and send instructions to the electricity meter 108C to keep the internal switch 112C closed for continued service.

Figure 2:
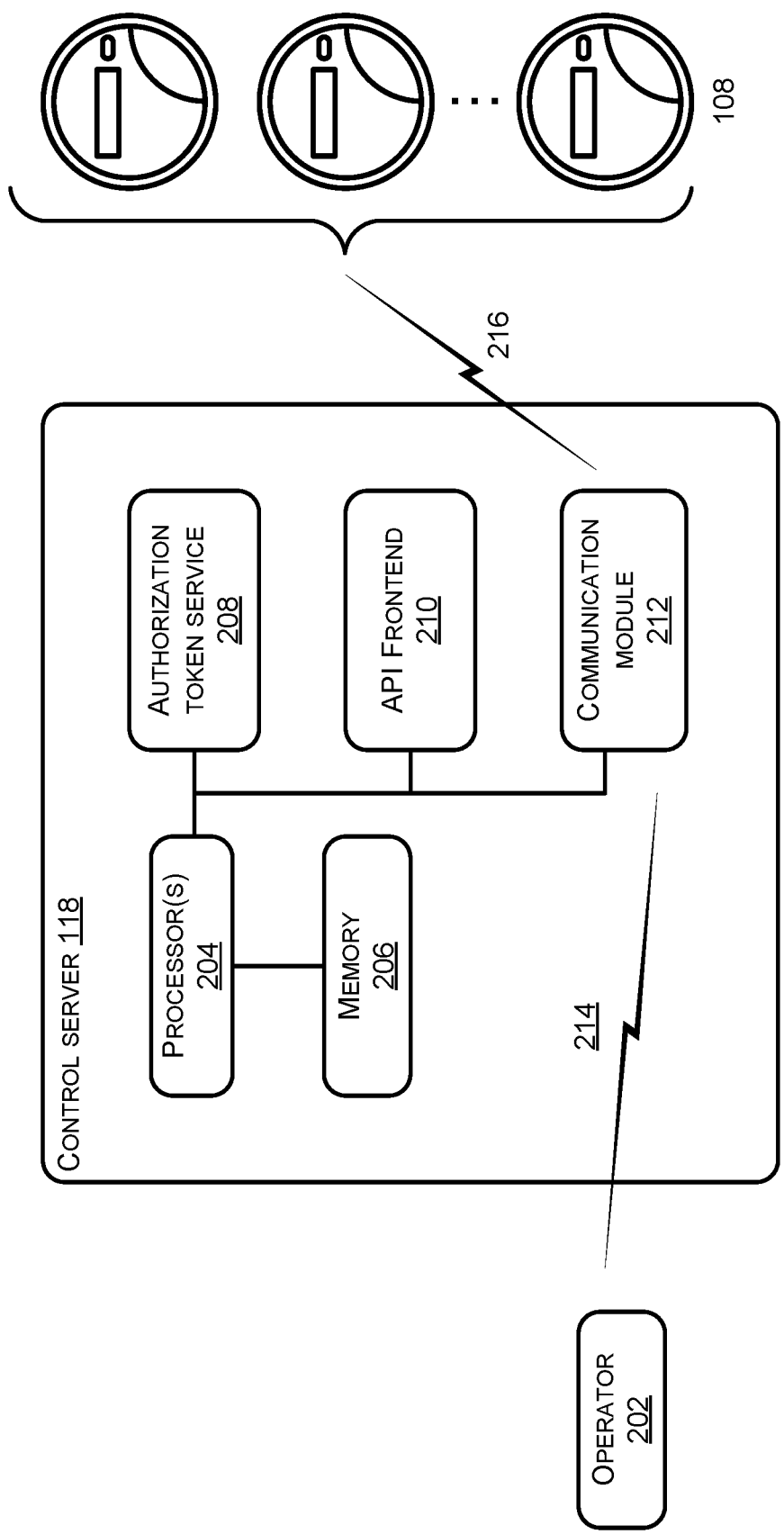
FIG. 2 illustrates a block diagram of an example control server of the AMI load shedding system.

FIG. 2 illustrates an example block diagram of the control server 118 of the AMI load shedding system 102. In this example, the control server 118 is shown in communication with an operator 202 of the utility provider and the electricity meters 108. While the control server 118 is illustrated as a single server in this example, the control server 118 may be distributed in nature and may comprise a plurality of separately located servers, computing devices, or modules.

The control server 118 may comprise one or more processors (e.g., processor(s) 204) communicatively coupled to memory 206. The processor(s) 204 may include one or more central processing units (CPUs), graphics processing units (GPUs), both CPUs and GPUs, or other processing units or components known in the art. The processor(s) 204 may execute computer-executable instructions stored in the memory 206 to perform functions or operations with one or more of components communicatively coupled to the one or more processor(s) 204 and the memory 206. Depending on the exact configuration of the control server 118, the memory 206 may be volatile, such as RAM, non-volatile, such as ROM, flash memory, miniature hard drive, memory card, some combination thereof, or the like. The memory 206 may store computer-executable instructions that are executable by the processor(s) 204.

The components of the control server 118 coupled to the processor(s) 204 and the memory 206 may comprise an authorization token service 208, an application programming interface (API) frontend 210, and a communication module 212. All communication to and from the control server 118 may be managed via the communication module 212 through a communication network, such as a cellular communication network, a WLAN, a mesh network, power line communication network, the internet, and the like. For example, the communication module 212 manages communications between the control server 118 and the operator 202, shown with an arrow 214, and between the control server 118 and the electricity meters 108, shown with an arrow 216. Operations of the authorization token service 208, the API frontend 210, and the electricity meters 108 are further described below with reference to FIGS. 3-8.

Figure 3:
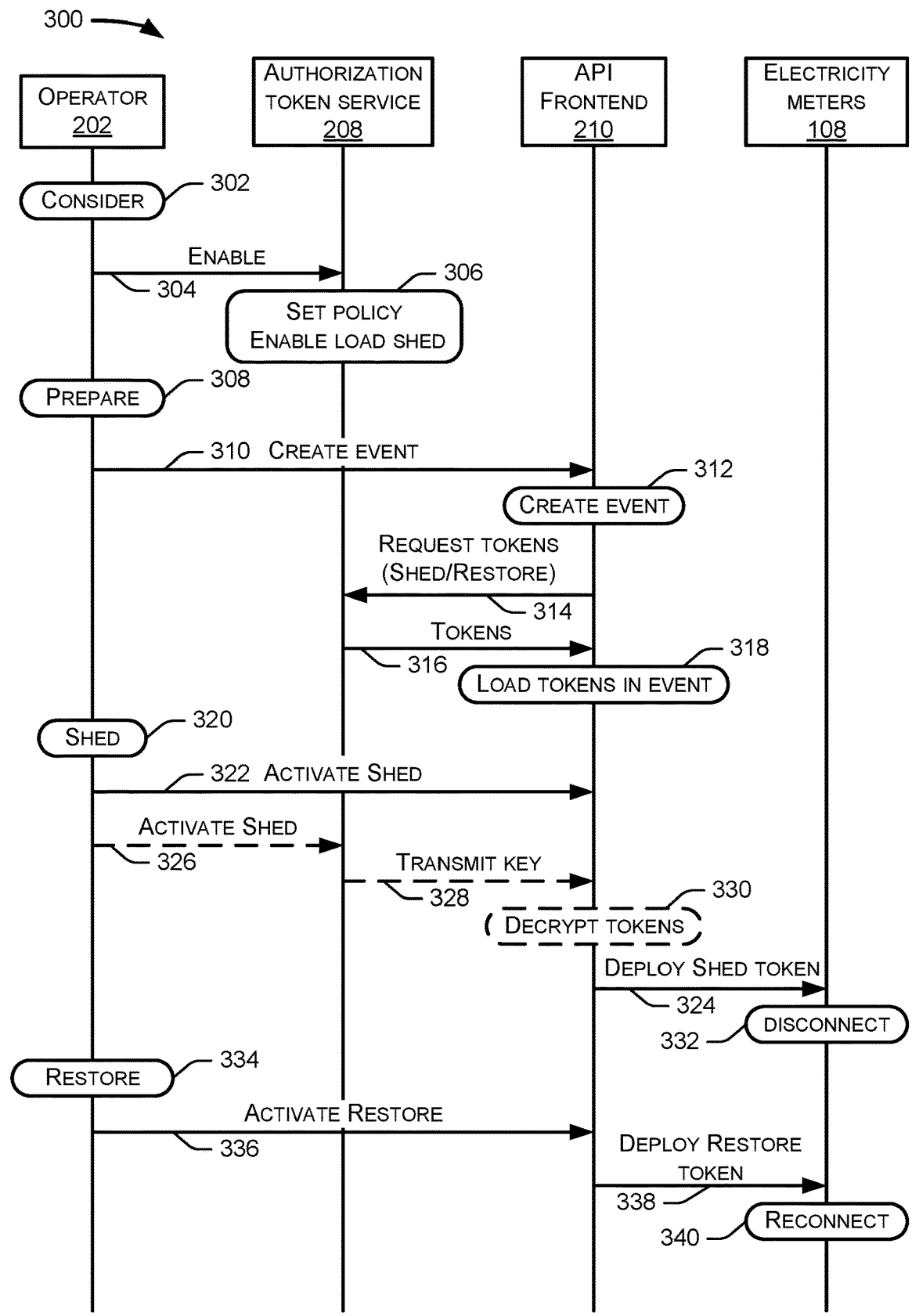
FIG. 3 illustrates an example flow process for shedding loads utilizing the AMI load shedding system.

FIG. 3 illustrates an example flow process 300 for shedding loads utilizing the AMI load shedding system 102. Based on factors, such as the weather forecast, current grid conditions, scheduled maintenance, available supply, and other factors, the operator 202 of the utility provider may determine that the demand for electricity may soon exceed the available supply, and consider utilizing a load shedding event for non-critical loads to maintain supply to critical loads such as hospitals and police stations at step 302. At step 304, the operator 202 may send an ENABLE command to the authorization token service 208, and in response to receiving the ENABLE command, the authorization token service 208 may set a policy and enable a load shedding process for the AMI load shedding system 102 at step 306. The policy may include a target group, or groups, of electricity meters to disconnect the associated premises, a disconnecting sequence of the premises, a duration of disconnection, a default reconnection timing, and other parameters associated with the load shedding event.

At step 308, the operator 202 may decide to prepare the load shedding event based on the factors from step 302 and predetermined conditions regarding the factors, such as timing and/or extent of the forecasted weather event, and send a CREATE EVENT command to the API frontend 210 at step 310. In response to receiving the CREATE EVENT command, the API frontend 210 may create the load shedding event at step 312. At step 314, the API frontend 210 may send a request to the authorization token service 208 for a load shedding token (SHED token) to be used for the load shedding event. The request may additionally be for a load restoration token (RESTORE token) to be used for reconnecting the disconnected loads after the load shedding event. In response to receiving the request, the authorization token service 208, at step 316, may send the token(s) consistent with the policy to the API frontend 210, which may load the token(s) in the load shedding event at step 318. The token(s) may be encrypted.

At step 320, the operator 202 may decide to execute the load shedding event. If the tokens are not encrypted, the operator 202 may send a load shedding activation (ACTIVATE SHED) command to the API frontend 210 at step 322. In response to receiving the ACTIVATE SHED command, the API frontend 210 may deploy the SHED token to the target group(s) of electricity meters 108 in accordance with the policy at step 324. If the tokens are encrypted, the step 322 may include additional steps 326, 328, and 330, shown with dotted lines, described as follows. At step 326, the operator 202 may send an ACTIVATE SHED command to the authorization token service 208. In response to receiving the ACTIVATE SHED command, the authorization token service 208 may transmit a key for the tokens to the API frontend 210 at step 328, and the API frontend 210 may decrypt the tokens using the key at step 330. The API frontend 210 may then deploy the SHED token to the target group(s) of electricity meters 108 in accordance with the policy at step 324. In response to receiving the SHED token, the target group(s) of electricity meters 108 may send a SHED token receipt confirmation to the operator 202 via the API frontend 210, and disconnect the associated premises, or loads, at step 332, for example, by opening the internal switch 112 as described above with reference to FIG. 1. In other words, the control server 118 causes the target group(s) of electricity meters 108 to disconnect the associated loads by providing the SHED token, via the API frontend 210, to the target group(s) of electricity meters 108. The target group(s) of electricity meters 108 may additionally send a disconnect status report after disconnecting the loads to the operator 202 via the API frontend 210.

At step 334, the operator 202 may decide to restore the disconnected loads, i.e., to reconnect the disconnected premises, and send an ACTIVATE RESTORE command to the API frontend 210 at step 336. In response to receiving the ACTIVATE RESTORE command, the API frontend 210 may deploy the RESTORE token to the target group(s) of electricity meters 108 at step 338. In response to receiving the RESTORE token, the target group(s) of electricity meters 108 may send a RESTORE token receipt confirmation to the operator 202 via the API frontend 210, and restore the associated premises, or loads, in accordance with the policy at step 340. In other words, the control server 118 causes the target group(s) of electricity meters 108 to reconnect the disconnected loads by providing the RESTORE token, via the API frontend 210, to the target group(s) of electricity meters 108. For example, to avoid a surge in the grid 116 due to a simultaneous reconnection of the loads, the target group(s) of electricity meters 108 may reconnect the associated loads at a randomly selected time between a preselected time period, such as a randomly selected time within two hours of receiving the RESTORE token.

Additionally, or alternatively, to avoid leaving the loads disconnected indefinitely, such as a communication error preventing the RESTORE token from being sent or received, a default reconnection instruction may be included in the SHED token. In other words, the SHED and RESTORE tokens are encrypted with the same key transmitted by the authorization token service 208 for the tokens to the API frontend 210 at step 328. Because at the moment of the SHED is activated, the RESTORE also becomes actionable when a timeout, i.e., the default reconnection, occurs, which may only happen if the API frontend 210 already had all the required information to activate the RESTORE. For example, if an electricity meter does not receive the RESTORE token within 48 hours after disconnecting the associated load, the electricity meter may automatically reconnect the load. The target group(s) of electricity meters 108 may additionally send a restore status report after reconnecting the loads to the operator 202 via the API frontend 210.

Alternatively, two keys, one for the SHED token and another for the RESTORE token, may be separately provided to the API frontend 210. After being disconnected from the grid 116, the group(s) of electricity meters 108 may be prevented from automatically reconnecting to the grid 116 for additional security and/or safety. For example, the key for the RESTORE token may be provided only in response to receiving an indication or notification of the group(s) of electricity meters 108 having passed a pre-reconnect inspection.

While the steps 302, 308, 320, and 334 are described as inputs from the operator 202, the inputs may also be generated by an automated system. For example, the automated system may collect and consider the factors at step 302, determine to prepare the AMI load shedding system 102, execute the load shedding event, and determine to restore the loads, based on the factors and predetermined parameters regarding the factors and parameters at steps 308, 320, and 334.

Figure 4:
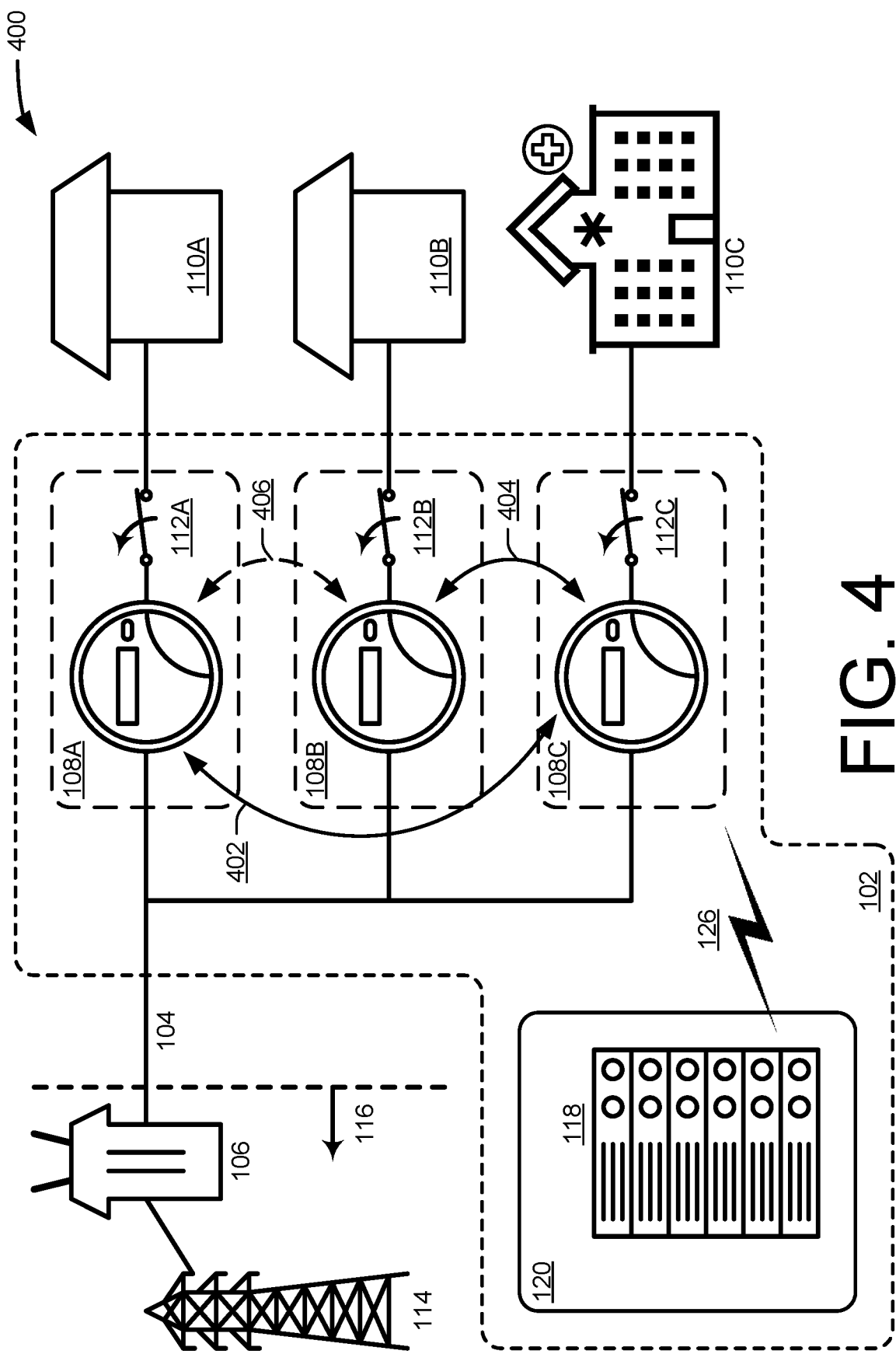
FIG. 4 illustrates another example environment in which the AMI load shedding system with a distributed agent may be utilized.

FIG. 4 illustrates an example environment 400 in which the AMI load shedding system 102 with a distributed agent may be utilized. Instead of the control server 118, or more specifically the API frontend 210 of the control server 118, sending tokens directly to each electricity meter in the group(s) of the electricity meters 108 as described above with reference to FIGS. 1 and 3, the API frontend 210 may send tokens to a distributed agent of the group(s) of the electricity meters 108 of the AMI load shedding system 102.

In this example, the distributed agent is represented by the electricity meter 108C, which may perform as a communication hub for the other electricity meters 108 in the group, such as the electricity meters 108A and 108B. For example, the electricity meter 108C may communicate with the control server 118 as shown by the arrow 126, receive the tokens from the control server 118, and forward the tokens to the electricity meters 108A and 108B as shown by arrows 402 and 404. The tokens may also be relayed from the electricity meter 108C to the electricity meter 108B as shown by arrow 404, then to the electricity meter 108A as shown by dotted-line arrow 406. However, the distributed agent need not be operating on an electricity meter, such as the electricity meter 108C. The distributed agent may be operating on a relay, access point, transformer monitor, or any other distribution management equipment that is equipped with a network interface and distributed intelligence/edge compute capability (a capable device). A host device for the distributed agent may be selected, for example, based on having the best radio properties among the capable devices in the neighborhood, such as having the highest signal strength due to convenient location, such as high up on a pole.

Figure 5:
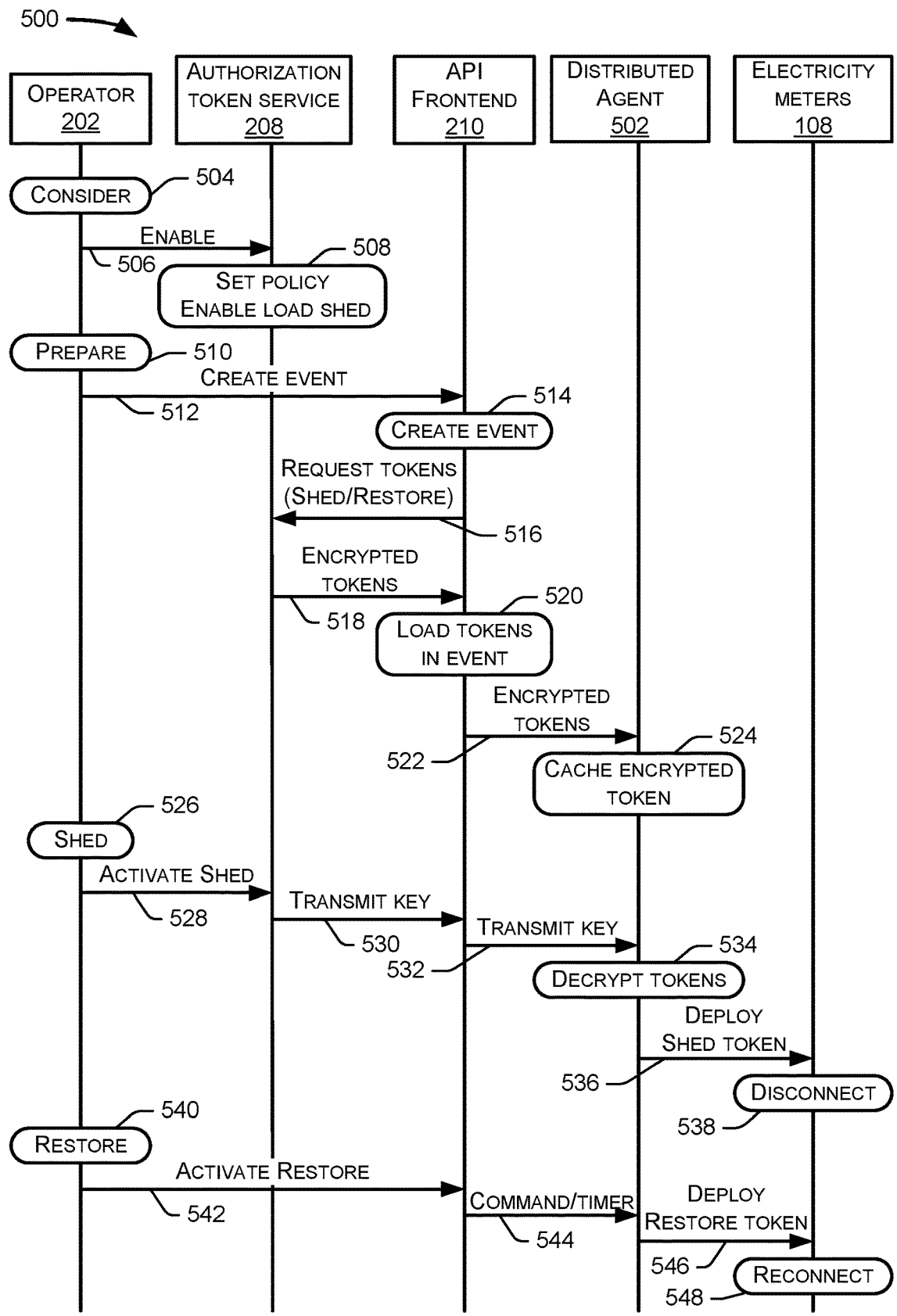
FIG. 5 illustrates an example flow process for shedding loads utilizing the AMI load shedding system with the distributed agent.

FIG. 5 illustrates an example flow process 500 for shedding loads utilizing the AMI load shedding system 102 with one of the electricity meters as the distributed agent. In this example, the electricity meters 108 form a mesh network, and the electricity meter 108C is described below as operating as the distributed agent 502 of the AMI load shedding system 102. Instead of the API frontend 210 sending tokens directly to each electricity meter in the group(s) of the electricity meters 108 as described above with reference to FIGS. 1, 3, and 4, the API frontend 210 may send tokens to the distributed agent 502 of the group(s) of the electricity meters 108 of the AMI load shedding system 102. In this example, the distributed agent 502 is represented by the electricity meter 108C, which may perform as a communication hub for the other electricity meters 108 in the group, such as the electricity meters 108A and 108B. Because the electricity meters 108 form a mesh network, if the electricity meter 108C becomes unavailable to operate as the distributed agent 502, another electricity meter may automatically assume the role of the distributed agent of the AMI load shedding system 102.

Similar to the flow process described above with reference to FIG. 3, based on the weather forecast, current grid conditions, scheduled maintenance, available supply, and other factors, the operator 202 of the utility provider may determine that the demand for electricity may soon exceed the available supply, and consider utilizing a load shedding event for non-critical loads to maintain supply to critical loads such as hospitals and police stations at step 504. At step 506, the operator 202 may send an ENABLE command to the authorization token service 208, and in response to receiving the ENABLE command, the authorization token service 208 may set a policy and enable a load shedding process for the AMI load shedding system 102 at step 508. The policy may include a target group, or groups, of electricity meters to disconnect the associated premises, a disconnecting sequence of the premises, a duration of disconnection, a default reconnection timing, and other parameters associated with the load shedding event.

At step 510, the operator 202 may decide to prepare the load shedding event, and send a CREATE EVENT command to the API frontend 210 at step 512. In response to receiving the CREATE EVENT command, the API frontend 210 may create the load shedding event at step 514. At step 516, the API frontend 210 may send a request to the authorization token service 208 for a SHED token to be used for the load shedding event and for a RESTORE token to be used for reconnecting the disconnected loads after the load shedding event. In response to receiving the request, the authorization token service 208 may send encrypted SHED and RESTORE tokens consistent with the policy to the API frontend 210 at step 518. The API frontend 210 may load the encrypted SHED and RESTORE tokens in the load shedding event at step 520, and forward the encrypted SHED and RESTORE tokens to the distributed agent 502, at step 522. At step 524, the distributed agent 502 caches the encrypted SHED and RESTORE tokens.

At step 526, the operator 202 may decide to execute the load shedding event. At step 528, the operator 202 may send a load shedding activation (ACTIVATE SHED) command to the authorization token service 208. In response to receiving the ACTIVATE SHED command, the authorization token service 208 may transmit a key for the SHED and RESTORE tokens to the API frontend 210 at step 530, and the API frontend 210 may forward the key to the distributed agent 502 at step 532. The distributed agent 502 may decrypt the SHED and RESTORE tokens using the key at step 534, and then deploy the SHED token to the target group(s) of electricity meters 108, such as the electricity meters 108A and 108B, in accordance with the policy at step 536. In response to receiving the SHED token, the target group(s) of electricity meters 108 may send a SHED token receipt confirmation to the operator 202 via the distributed agent 502 and the API frontend 210, and disconnect the associated premises, or loads, at step 538, for example, by opening the internal switch 112 as described above with reference to FIG. 1. In other words, the control server 118 causes the target group(s) of electricity meters 108 to disconnect the associated loads by providing the SHED token, via the distributed agent 502, to the target group(s) of electricity meters 108. The target group(s) of electricity meters 108 may additionally send a disconnect status report after disconnecting the loads to the operator 202 via the distributed agent 502 and the API frontend 210.

At step 540, the operator 202 may decide to restore the disconnected loads, i.e., to reconnect the disconnected premises, and send a load restoration activation (ACTIVATE RESTORE) command to the API frontend 210 at step 542. In response to receiving the ACTIVATE RESTORE command, the API frontend 210 may send a command and/or timer information to the distributed agent 502 at step 544. In response to receiving the command/timer information, the distributed agent 502 may deploy the RESTORE token to the target group(s) of electricity meters 108 at step 546 in accordance with the command/timer information. For example, the command may instruct the distributed agent 502 to deploy the RESTORE token to the target group(s) of electricity meters 108 upon receipt or the timer information may indicate to the distributed agent 502 to deploy the RESTORE token to the target group(s) of electricity meters 108 after a predetermined time period after receiving the command, such as one-hour. In response to receiving the RESTORE token, the target group(s) of electricity meters 108 may send a RESTORE token receipt confirmation to the operator 202 via the distributed agent 502 and the API frontend 210, and restore, or reconnect, the associated premises, or loads, in accordance with the policy at step 548. In other words, the control server 118 causes the target group(s) of electricity meters 108 to reconnect the disconnected loads by providing the RESTORE token, via the distributed agent 502, to the target group(s) of electricity meters 108. For example, to avoid a surge in the grid 116 due to a simultaneous reconnection of the loads, the target group(s) of electricity meters 108 may reconnect the associated loads at a randomly selected time between a preselected time period, such as a randomly selected time within two hours of receiving the RESTORE token.

Additionally, or alternatively, to avoid leaving the loads disconnected indefinitely, such as a communication error preventing the RESTORE token from being sent or received, a default reconnection instruction may be included in the SHED token. In other words, the SHED and RESTORE tokens are encrypted with the same key transmitted by the authorization token service 208 for the tokens to the API frontend 210 at step 530 then forwarded to the distributed agent 502 at step 532. Because at the moment of the SHED is activated, the RESTORE also becomes actionable when a timeout, i.e., the default reconnection, occurs, which may only happen if the distributed agent 502 already had all the required information to activate the RESTORE. For example, if an electricity meter does not receive the RESTORE token within 48 hours after disconnecting the associated load, the electricity meter may automatically reconnect the load. The target group(s) of electricity meters 108 may additionally send a restore status report after reconnecting the loads to the operator 202 via the distributed agent 502 and the API frontend 210.

Alternatively, two keys, one for the SHED token and another for the RESTORE token, may be separately provided to the distributed agent 502. After being disconnected from the grid 116, the group(s) of electricity meters 108 may be prevented from automatically reconnecting to the grid 116 for additional security and/or safety. For example, the key for the RESTORE token may be provided only in response to receiving an indication or notification of the group(s) of electricity meters 108 having passed a pre-reconnect inspection.

While the steps 504, 510, 526, and 540 are described as inputs from the operator 202, the inputs may also be generated by an automated system. For example, the automated system may collect and consider the factors at step 504, determine to prepare the AMI load shedding system 102, execute the load shedding event, and determine to restore the loads, based on the factors and predetermined parameters regarding the factors and parameters at steps 510, 526, and 540.

Figure 6:
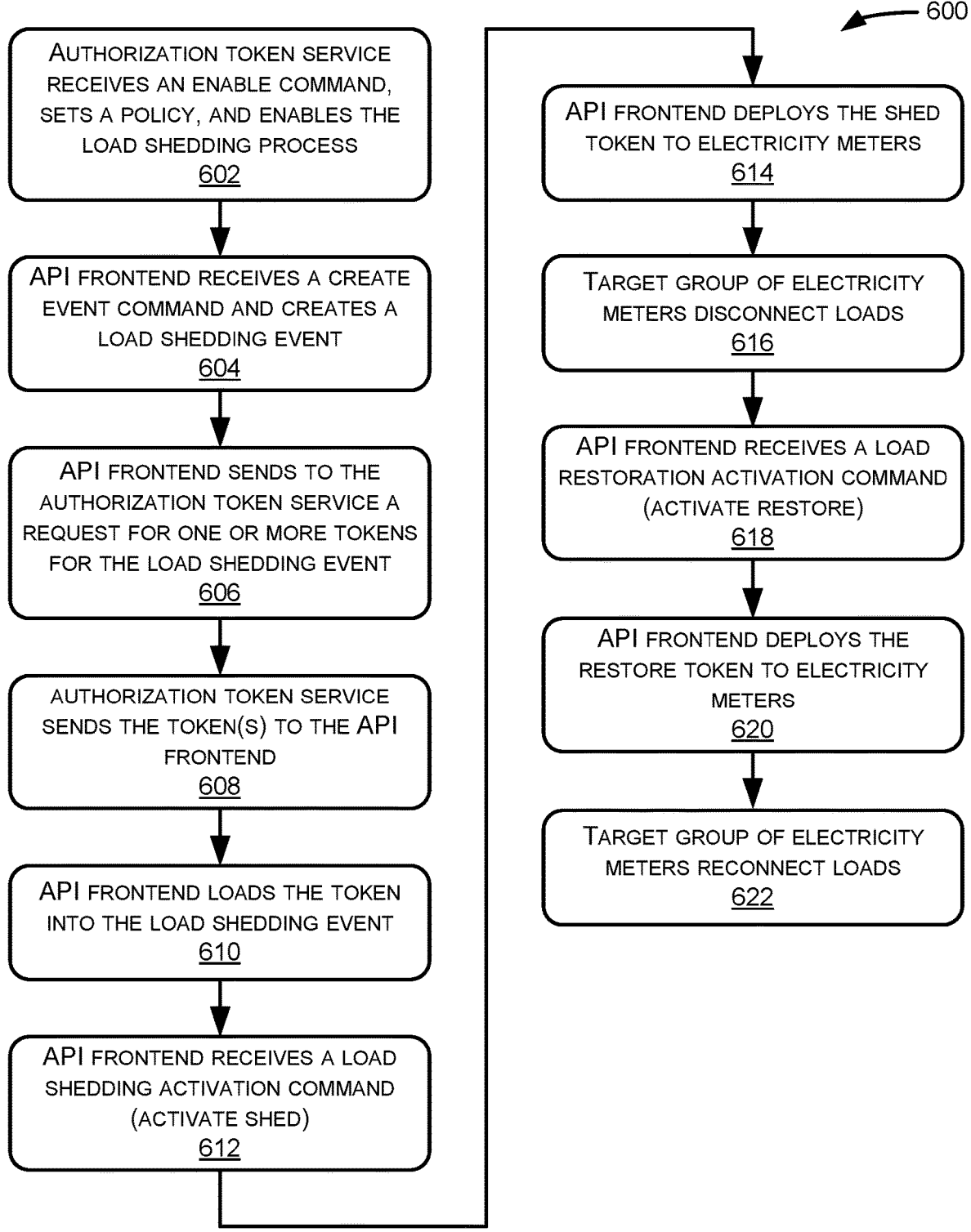
FIG. 6 illustrates a flowchart describing an example process for shedding loads utilizing the AMI load shedding system.

FIG. 6 illustrates an example flowchart 600 describing a process for shedding loads utilizing the AMI load shedding system 102. Based on factors, such as the weather forecast, current grid conditions, scheduled maintenance, available supply, and other factors, the operator 202 of the utility provider may determine that the demand for electricity may soon exceed the available supply, and consider utilizing a load shedding event for non-critical loads to maintain supply to critical loads such as hospitals and police stations as described above with reference to FIGS. 3 and 5. At block 602, the authorization token service 208 may receive an ENABLE command from the operator 202, and in response, may set a policy and enable a load shedding process for the AMI load shedding system 102. The policy may include a target group, or groups, of electricity meters to disconnect the associated premises, a disconnecting sequence of the premises, a duration of disconnection, a default reconnection timing, and other parameters associated with the load shedding event.

Based on the factors described above and predetermined conditions regarding the factors, such as timing and/or extent of the forecasted weather event as described above with reference to FIGS. 3 and 5, the operator 202 may decide to prepare the load shedding event. At block 604, the API frontend 210 may receive from the operator 202 a CREATE EVENT command, and in response, may create a load shedding event. At block 606, the API frontend 210 may send a request to the authorization token service 208 for one or more tokens for the load shedding event. The one or more tokens requested include a SHED token to be used for shedding the loads and may additionally include a RESTORE token to be used for reconnecting the disconnected loads after the load shedding event. In response to receiving the request, the authorization token service 208 may send the one or more tokens, which may be encrypted, to the API frontend 210, and the API frontend 210 receives the one or more tokens at block 608. At block 610, the API frontend 210 may load the one or more tokens in the load shedding event.

In response to the operator 202 deciding to execute the load shedding event, the API frontend 210 may receive a load shedding activation (ACTIVATE SHED) command at block 612. In response to receiving the ACTIVATE SHED command, the API frontend 210 may deploy the SHED token to the target group(s) of electricity meters 108 in accordance with the policy at block 614. In response to receiving the SHED token, the target group(s) of electricity meters 108 may send a SHED token receipt confirmation to the operator 202 via the API frontend 210, and disconnect the associated premises, or loads, at block 616, for example, by opening the internal switch 112 as described above with reference to FIG. 1. The target group(s) of electricity meters 108 may additionally send a disconnect status report after disconnecting the loads to the operator 202 via the API frontend 210.

In response to the operator 202 deciding to restore the disconnected loads, i.e., to reconnect the disconnected premises, the API frontend 210 may receive a load restoration activation (ACTIVATE RESTORE) command at block 618. In response to receiving the ACTIVATE RESTORE command, the API frontend 210 may deploy the RESTORE token to the target group(s) of electricity meters 108 at block 620. In response to receiving the RESTORE token, the target group(s) of electricity meters 108 may send a RESTORE token receipt confirmation to the operator 202 via the API frontend 210, and restore the associated premises, or loads, in accordance with the policy at block 622. For example, to avoid a surge in the grid 116 due to a simultaneous reconnection of the loads, the target group(s) of electricity meters 108 may reconnect the associated loads at a randomly selected time between a preselected time period, such as a randomly selected time within two hours of receiving the RESTORE token. Additionally, or alternatively, to avoid leaving the loads disconnected indefinitely, such as a communication error preventing the RESTORE token from being sent or received, a default reconnection instruction may be included in the SHED token. For example, if an electricity meter does not receive the RESTORE token within 48 hours after disconnecting the associated load, the electricity meter may automatically reconnect the load. The target group(s) of electricity meters 108 may additionally send a restore status report after reconnecting the loads to the operator 202 via the API frontend 210.

Figure 7:
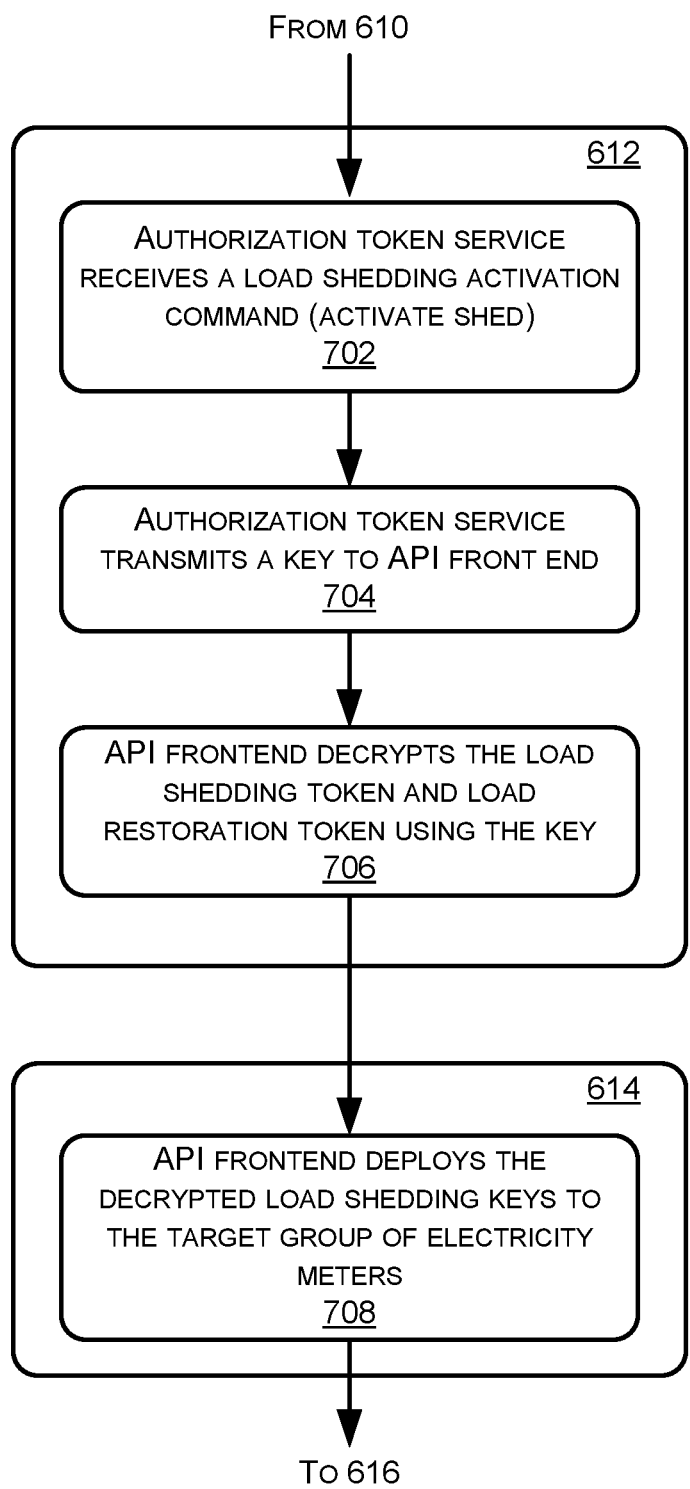
FIG. 7 illustrates a flowchart further describing examples of some of the blocks of FIG. 6.

FIG. 7 illustrates an example flowchart further describing blocks 612 and 614 of FIG. 6 when the load shedding token and the load restoration token are encrypted. At block 702, the authorization token service 208 may receive the load shedding activation command, and transmit a key to the API frontend 210 at block 704. At block 706, the API frontend 210 may decrypt the load shedding token and the load restoration token using the key, and deploy the decrypted load shedding token to the target group of electricity meters 108 at block 708.

Figure 8:
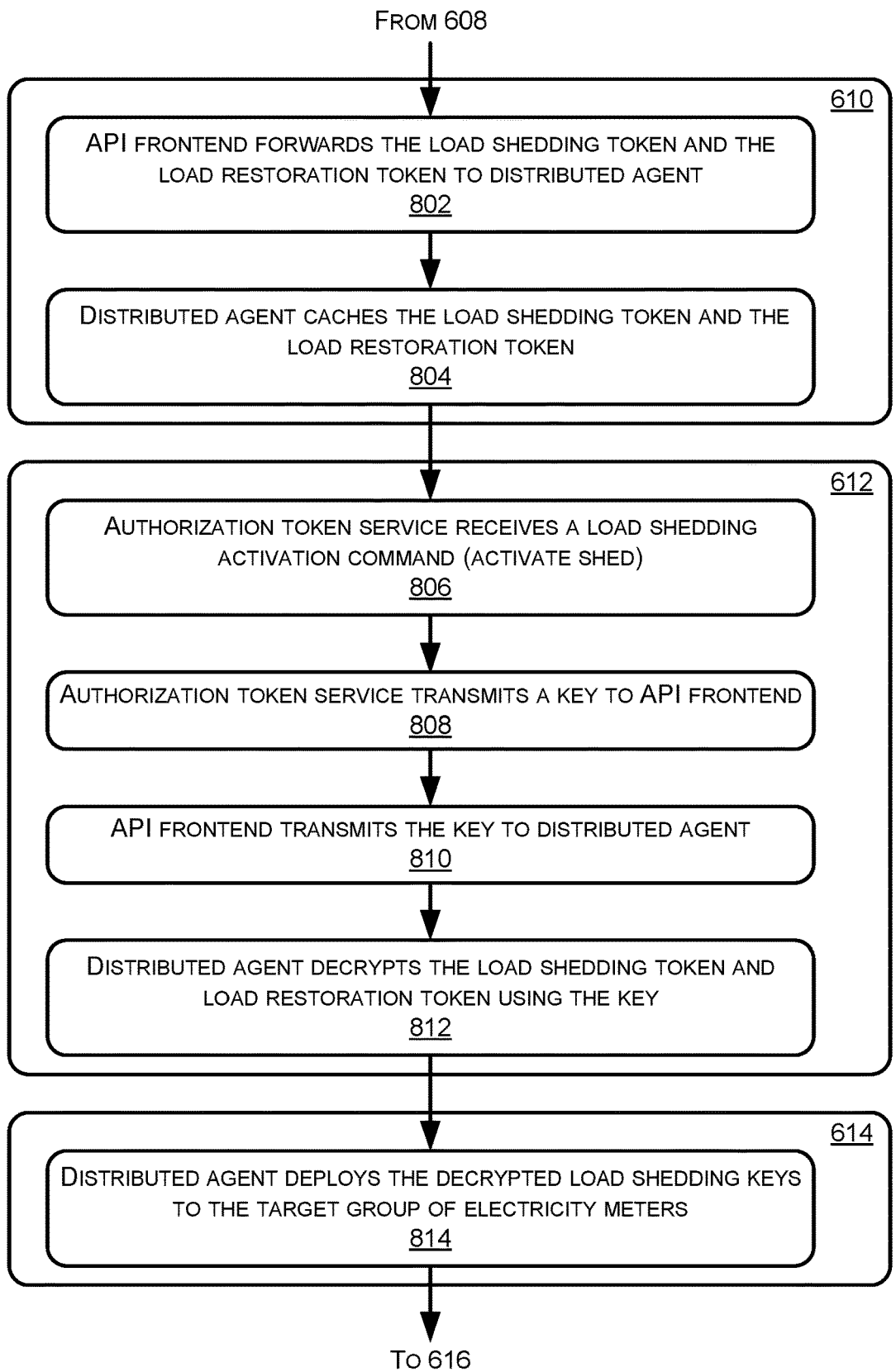
FIG. 8 illustrates another flowchart further describing examples of some of the blocks of FIG. 6.

FIG. 8 illustrates another example flowchart further describing blocks 610, 612, and 614 of FIG. 6 when the load shedding token and the load restoration token are encrypted and a distributed agent is utilized. At block 802, the API frontend 210 may forward the load shedding token and the load restoration token to the distributed agent 502, and the distributed agent 502 may cache the load shedding token and the load restoration token at block 804. At block 806, the authorization token service 208 may receive the load shedding activation command, and transmit a key to the API frontend 210 at block 808. The API frontend may forward the key to the distributed agent 502 of the AMI load shedding system at block 810, and the distributed agent 502 may decrypt the load shedding token and the load restoration token using the key at block 812. At block 814, the distributed agent 502 may deploy the decrypted load shedding token to the target group of electricity meters 108.

Some or all operations of the methods described above can be performed by execution of computer-readable instructions stored on a computer-readable storage medium, as defined below. The terms "computer-readable medium," "computer-readable instructions," and "computer executable instruction" as used in the description and claims, include routines, applications, application modules, program modules, programs, components, data structures, algorithms, and the like. Computer-readable and -executable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 1-8. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed at least in part by an advanced metering infrastructure (AMI) load shedding system, the method comprising:
receiving, by an application programming interface (API) frontend of the AMI load shedding system, a load shedding activation command;
in response to receiving the load shedding activation command, deploying, by the API frontend, a load shedding token to one or more electricity meters of the AMI load shedding system; and
causing the one or more electricity meters to disconnect corresponding loads based at least in part on the load shedding token.

2. The method of claim 1, further comprising, prior to receiving the load shedding activation command by the API frontend:
setting, by an authorization token service of the AMI load shedding system, a policy for a load shedding event associated with the load shedding activation command, wherein the one or more electricity meters are a target group of electricity meters of the AMI load shedding system in accordance with the policy.

3. The method of claim 2, further comprising:
creating, by the API frontend, the load shedding event;
sending, by the API frontend, a request for tokens, the tokens including the load shedding token and a load restoration token;
receiving, by the API frontend, the load shedding token and the load restoration token; and
loading, by the API frontend, the load shedding token and the load restoration token into the load shedding event.

4. The method of claim 3, further comprising:
receiving, by the API frontend, a load restoration activation command;
in response to receiving the load restoration activation command, deploying, by the API frontend, the load restoration token to the target group of electricity meters; and
causing the target group of electricity meters to reconnect the disconnected loads based at least in part on the load restoration token.

5. The method of claim 4, wherein:
the load shedding token and the load restoration token are encrypted,
receiving, by the API frontend, the load shedding activation command includes:
receiving, by the authorization token service, the load shedding activation command,
transmitting, by the authorization token service, a key to the API frontend, and
decrypting, by the API frontend, the load shedding token and the load restoration token using the key, and
deploying, by the API frontend, the load shedding token to the target group of electricity meters includes:
deploying, by the API frontend, the decrypted load shedding token to the target group of electricity meters.

6. The method of claim 4, wherein:
the load shedding token and the load restoration token are encrypted,
receiving, by the API frontend, the load shedding activation command includes:
receiving, by the authorization token service, the load shedding activation command,
transmitting, by the authorization token service, a key to the API frontend,
forwarding, by the API frontend, the key to a distributed agent of the AMI load shedding system, and
decrypting, by the distributed agent, the load shedding token and the load restoration token using the key, and
deploying, by the API frontend, the load shedding token to the target group of electricity meters includes:
deploying, by the distributed agent, the decrypted load shedding token to the target group of electricity meters.

7. The method of claim 6, wherein loading, by the API frontend, the load shedding token and the load restoration token into the load shedding event includes:
forwarding, by the API frontend, the load shedding token and the load restoration token to the distributed agent; and
caching, by the distributed agent, the load shedding token and the load restoration token.

8. The method of claim 7, wherein deploying, by the API frontend, the load restoration token to the target group of electricity meters includes:
sending, by the API frontend, a command and timer information to the distributed agent; and
deploying, by the distributed agent, the load restoration token to the target group of electricity meters based on the command and the timer information.

9. The method of claim 6, wherein the distributed agent is an electricity meter of the target group of electricity meters.

10. An advanced metering infrastructure (AMI) load shedding system comprising:
one or more processors,
an application programming interface (API) frontend coupled to the one or more processors, and
memory coupled to the one or more processors, the memory storing thereon computer-readable instructions that, when executed by the one or more processors, cause the one or more processors to perform operations comprising:
receiving, by the API frontend, a load shedding activation command;

in response to receiving the load shedding activation command, deploying, by the API frontend, a load shedding token to a plurality of electricity meters; and causing the plurality of electricity meters to disconnect corresponding loads based at least in part on load shedding token.

11. The AMI load shedding system of claim 10, further comprising:

an authorization token service coupled to the one or more processors, wherein the operations further comprise, prior to receiving, by the API frontend, the load shedding activation command:

setting, by the authorization token service, a policy for a load shedding event associated with the load shedding activation command, wherein the plurality of electricity meters is a target group of electricity meters of the AMI load shedding system in accordance with the policy;

creating, by the API frontend, the load shedding event;

sending, by the API frontend, a request for tokens, the tokens including the load shedding token and a load restoration token;

receiving, by the API frontend, the load shedding token and the load restoration token; and loading, by the API frontend, the load shedding token and the load restoration token into the load shedding event.

12. The AMI load shedding system of claim 11, wherein the operations further comprise:

receiving, by the API frontend, a load restoration activation command;

in response to receiving the load restoration activation command, deploying, by the API frontend, the load restoration token to the target group of electricity meters; and causing the target group of electricity meters to reconnect the disconnected loads based at least in part on the load restoration token.

13. The AMI load shedding system of claim 12, wherein:

the load shedding token and the load restoration token are encrypted, receiving, by the API frontend, the load shedding activation command includes:

receiving, by the authorization token service, the load shedding activation command, transmitting, by the authorization token service, a key to the API frontend, and decrypting, by the API frontend, the load shedding token and the load restoration token using the key, and deploying, by the API frontend, the load shedding token to the target group of electricity meters includes:

deploying, by the API frontend, the decrypted load shedding token to the target group of electricity meters.

14. The AMI load shedding system of claim 12, wherein:

the load shedding token and the load restoration token are encrypted, loading, by the API frontend, the load shedding token and the load restoration token into the load shedding event includes:

forwarding, by the API frontend, the load shedding token and the load restoration token to a distributed agent, and caching, by the distributed agent, the load shedding token and the load restoration token, receiving, by the API frontend, the load shedding activation command includes:

receiving, by the authorization token service, the load shedding activation command, transmitting, by the authorization token service, a key to the API frontend, forwarding, by the API frontend, the key to a distributed agent of the AMI load shedding system, the distributed agent being an electricity meter of the target group of electricity meters, and decrypting, by the distributed agent, the load shedding token and the load restoration token using the key, and deploying, by the API frontend, the load shedding token to the target group of electricity meters includes:

deploying, by the distributed agent, the decrypted load shedding token to the target group of electricity meters.

15. The AMI load shedding system of claim 14, wherein deploying, by the API frontend, the load restoration token to the target group of electricity meters includes:

sending, by the API frontend, a command and timer information to the distributed agent; and deploying, by the distributed agent, the load restoration token to the target group of electricity meters based on the command and the timer information.

16. A non-transitory computer-readable storage medium storing thereon computer executable instructions that, when executed by one or more processors of an advanced metering infrastructure (AMI) load shedding system, cause the one or more processors to perform operations comprising:

setting, by an authorization token service of the AMI load shedding system, a policy for a load shedding event associated with a load shedding activation command;

creating, by an application programming interface (API) frontend of the AMI load shedding system, the load shedding event;

sending, by the API frontend, a request for tokens to the authorization token service, the tokens including the load shedding token and a load restoration token;

receiving, by the API frontend, the load shedding token and the load restoration token from the authorization token service;

loading, by the API frontend, the load shedding token and the load restoration token into the load shedding event;

receiving, by the API frontend, a load shedding activation command;

in response to receiving the load shedding activation command, deploying, by the API frontend, the load shedding token to a target group of electricity meters of the AMI load shedding system in accordance with the policy; and causing the group of electricity meters to disconnect corresponding loads based at least in part on the load shedding token.

17. The non-transitory computer-readable storage medium of claim 16, wherein the operations further comprise:

receiving, by the API frontend, a load restoration activation command;

in response to receiving the load restoration activation command, deploying, by the API frontend, the load restoration token to the target group of electricity meters; and causing the target group of electricity meters to reconnect the disconnected loads based at least in part on the load restoration token.

18. The non-transitory computer-readable storage medium of claim 17, wherein:
the load shedding token and the load restoration token are encrypted,
receiving, by the API frontend, the load shedding activation command includes:
receiving, by the authorization token service, the load shedding activation command,
transmitting, by the authorization token service, a key to the API frontend, and
decrypting, by the API frontend, the load shedding token and the load restoration token using the key, and
deploying, by the API frontend, the load shedding token to the target group of electricity meters includes:
deploying, by the API frontend, the decrypted load shedding token to the target group of electricity meters.

19. The non-transitory computer-readable storage medium of claim 17, wherein:
the load shedding token and the load restoration token are encrypted,
loading, by the API frontend, the load shedding token and the load restoration token into the load shedding event includes:
forwarding, by the API frontend, the load shedding token and the load restoration token to a distributed agent of the AMI load shedding system, and
caching, by the distributed agent, the load shedding token and the load restoration token,
receiving, by the API frontend, the load shedding activation command includes:
receiving, by the authorization token service, the load shedding activation command,
transmitting, by the authorization token service, a key to the API frontend,
forwarding, by the API frontend, the key to the distributed agent of the AMI load shedding system, and
decrypting, by the distributed agent, the load shedding token and the load restoration token using the key, and
deploying, by the API frontend, the load shedding token to the target group of electricity meters includes:
deploying, by the distributed agent, the decrypted load shedding token to the target group of electricity meters.

20. The non-transitory computer-readable storage medium of claim 19, wherein deploying, by the API frontend, the load restoration token to the target group of electricity meters includes:
sending, by the API frontend, a command and timer information to the distributed agent; and
deploying, by the distributed agent, the load restoration token to the target group of electricity meters based on the command and the timer information.

* * * * *